3,192,764
BS & W INDICATOR
Albert W. Jasek, Houston, Tex., assignor, by mesne assignments, to Esso Research and Engineering Company, Elizabeth, N.J., a corporation of Delaware
Filed July 3, 1961, Ser. No. 121,422
3 Claims. (Cl. 73—53)

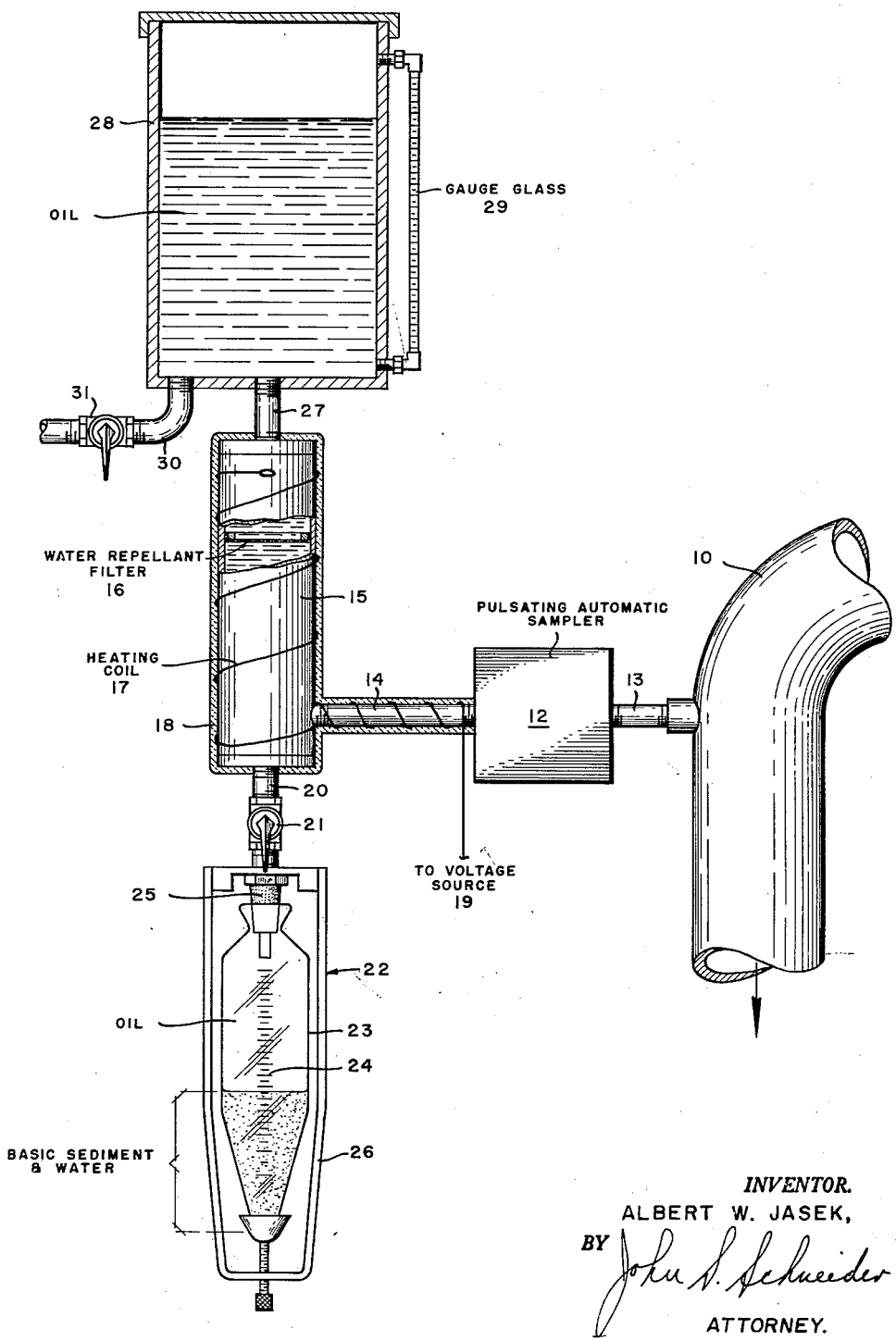

This invention relates to apparatus for continuously treating and separating BS & W (basic sediment and water) from a petroleum liquid.

To determine BS & W content of crude oil, it is customary practice at the present time to take a proportional sample, e.g., 5 gallons, that is representative of a much larger volume of oil and measure the percentage BS & W content of the oil based on a centrifuge test of a 50 ml. portion of the 5-gallon sample. However, this technique does not produce accurate results, because it is difficult to obtain a 50 ml. portion that is representative of the 5-gallon sample, especially when free water is present.

As an illustration of the inadequacy of tests of this type, 2 ml. of water was added to 1000 ml. of crude oil that was free of BS & W. Thus, the known concentration of the water was 0.2 percent; however, tests showed the content to range from 0.05 percent to 0.15 percent. Vigorous shaking of the sample caused water droplets to disperse and by preferential wetting adhere to the internal surface of the container. Laboratory tests showed that 0.1 ml. to 0.15 ml. of water will adhere to the internal surface of a 100 ml. centrifuge tube, which indicates that 0.1 to 0.15 percent of free water in a sample could adhere to the internal surface of a 5-gallon container. This illustration shows that vigorous shaking of the container increases the tendency of water to adhere to the internal surface of it, which prevents taking of a representative sample; however, if the sample is not shaken vigorously, then the water may not be evenly dispersed, and again the taking of a representative sample would be prevented.

The apparatus of this invention solves this problem by continuously treating and removing BS & W from each portion of a sample as it is removed from the custody transfer delivery line.

Briefly, this apparatus comprises a water-repellent membrane arranged in a horizontal position in a treating chamber, a trap located below the treating chamber and an oil storage vessel located above the treating chamber. Means for heating the treating chamber is provided in order to prevent the water-repellent filter from clogging with paraffin. The sample stream is directed into the treating chamber below the filter, which causes water to be repelled by the filter and drop out in the trap or settling tube and the clean oil to pass upwardly though the filter into the storage vessel. When the delivery of a batch of crude oil is completed, the BS & W is determined by measuring the amount of water and basic sediment collected in the centrifuge-settling tube or trap and the volume of oil processed through the filter. The settling tube is graduated, and the storage vessel is provided with a graduated gauge glass for these purposes. If there is any doubt as to the oil-water interface in the settling tube, the tube may be removed, heated, and centrifuged. Laboratory experiments show that the apparatus will remove water and basic sediment to the extent that a centrifuge test on the treated oil in the storage container will indicate negligible basic sediment and water.

Although the use to which the apparatus is put as described in the application relates to determining the BS & W content of produced crude oil, the apparatus also may be applied on a larger scale to processes for treating produced crude oil in addition to removing water from jet fuels, aviation gasolines, and motor gasolines.

The objects and advantages of the invention will be more apparent from a more detailed description of the invention when taken in conjunction with the drawings in which the sole figure is a vertical, partly sectional view of the apparatus connected to a crude-stream custody-transfer delivery line.

Referring to the drawing in greater detail, a custody-transfer crude-stream delivery line 10 is shown connected to a sample probe not shown, which feeds crude oil from line 10 to a pulsating automatic sampler 12 through conduit 13. A conduit 14 conducts the oil sample from sampler 12 to a cylindrical sample-treating chamber 15. A water repellent filter 16, is installed in a horizontal position within treating chamber 15. A heating coil 17 is wrapped around conduit 14 and chamber 15, and insulation 18 also surrounds these members. Coil 17 connects to a suitable source of electrical energy 19. The bottom of treating chamber 15 has connected to it a BS & W discharge line 20 provided with a valve 21. A trap 22 to collect the BS & W separated in chamber 15 is connected to the lower end of conduit 20, and it consists of a centrifuge tube 23 provided with a graduated scale indicated at 24 and connected to a rubber stopper 25 mounted on conduit 20. A harness assembly 26 secures tube 23 in position on stopper 25. The upper end of treating chamber 15 has connected to it a filtered oil discharge line 27, which in turn connects to a closed oil storage vessel 28. A gauge glass 29 provided with graduations is mounted on vessel 28. A drain conduit 30 for discharging the contents of vessel 28 is provided with a valve 31.

Filter 16 is made of a fine weave tetrafluoroethylene polymer plastic fiber Teflon cloth that separates water, sediment, emulsions, and other nonmerchantable materials carried in crude oil and its products from the crude oil itself. The filter permits its surface to be preferentially wet with oil and passage of oil through the filter, while at the same time repelling free and emulsified water carried in the oil. Heat is applied externally by means of heating coil 17, which is thermostatically controlled to keep the liquid in the treating chamber at a desired temperature and to prevent the filter from clogging with paraffin. Additionally, the heat functions to break emulsions that may have collected in chamber 15, and also it reduces the viscosity of the crude oil to allow water and sediment to settle from the oil at a faster rate. The capacity of treating chamber 15 below filter 16 is dependent upon the rate of sampling and the nature of the crude oil being tested. The capacity should be adequate to allow emulsions to remain in the chamber a sufficient time for the emulsions to break and release the water in the emulsion. The size of chamber 15 also is important in reducing the velocity of the inlet stream so that the stream velocity passing through chamber 15 does not exceed the rate water and sediment settles out of crude oil. Large drops of free water may never reach filter 16. Small or highly dispersed drops of water that do reach the filter collect on the bottom side of it and are brought closer together and eventually coalesce and become larger drops. The differences in the density of water and sediment and that of oil allow the water and sediment to settle out of the crude. Tube 23, which traps and collects the BS & W that settles out, may be an ASTM 100 cc., long or short cone-shaped centrifuge tube with 1 cc. graduations; or it may be any other container suitable for collecting and reading BS & W to the nearest 1 cc. At the beginning of the test, tube 23 should be filled with clean oil or varsol. The BS & W settles to the bottom of tube 23 and traps and displaces an equivalent volume of varsol or crude oil. When the test has been completed, the volume of BS & W collected is read to the nearest 1 cc. If the interface between the BS & W and oil is such as to cause a questionable reading, the graduated tube is readily disconnected from stopper 25 and centrifuged in a heated centrifuge tube. In extremely cold weather and with some type crudes, paraffin may collect at the bottom of tube 23 and interfere with the reading. In this case, the tube must be removed, heated, centrifuged, and then read to the nearest 1 cc. If necessary, the centrifuge tube may be heated with the same coil used to heat the treating chamber by extending the circuit.

Vessel 28 is used to store and measure the oil after it has been treated and processed through the filter in chamber 15. Vessel 28 should be large enough to accommodate a sample of 2.5 to 5 gallons, and the gauge glass 29 is graduated in the same units as the centrifuge tube 23.

Results obtained from an actual installation of this apparatus show the following:

(1) Tests on the oil processed in the unit indicate BS & W contents to the nearest 0.01 percent.
(2) The accuracy of the apparatus far exceeds the accuracy of conventional API and ASTM methods, because the instrument:
   (a) Permits BS & W to be reported to the nearest 0.01 percent.
   (b) Tests the complete sample instead of only a 50 cc. portion of it.
   (c) Eliminates the problem and time required to obtain a 50 cc. portion of the sample collected.
   (d) Can be used so that the positive displacement meter which pulses the automatic sampler may be used to determine the volume of the sample processed through the unit. In an arrangement of this type, the measuring chamber of the automatic sampler must be in the same units of measurement as centrifuge tube 23. Also, the sample must be a positive displacement type, so that each pulse will deliver the same size of sample to a treating chamber. As an example, assume that the sampler is set to take a 1 cc. sample from the stream for each 5 barrels and the volume of oil involved is 1000,000 barrels. During the metering of the 100,000 barrels of oil, 200,000 pulses would be delivered to the automatic sampler, and 20,000 cc.'s of oil would be processed through the BS & W instrument. A reading of 50 cc.'s of BS & W collected in the graduated tube 23 would indicate a BS & W percent of 0.25 for the oil involved. An electric counter may be used as an alternate method to measure the number of sampling pulses. After passing through the BS & W sampler, the clean oil could be returned immediately to line 10. If a gravity determination is necessary, the sample processed through the unit could be collected in a conventional container to prevent the loss of gravity by evaporation.
(3) Tests have shown that the difference between reading the BS & W in the centrifuge tube 23 of the instrument before and after centrifuging is negligible.

Having fully described the nature, objects, operation, and apparatus of my invention, I claim:

1. A BS & W indicator comprising:
   a generally cylindrical chamber having the axis thereof extending vertically adapted to separate BS & W from oil;
   a water-repellent filter arranged to extend generally horizontally across the interior of said chamber and dividing said chamber into upper and lower sections;
   means connected to said chamber for feeding oil containing BS & W to be separated and measured to the lower part of the lower section of said chamber;
   a tube connected to the bottom of said chamber for collecting BS & W separated from the oil in said chamber and graduated to measure the amount of BS & W collected in said tube;
   a storage vessel mounted above said chamber fluidly communicating with the upper section thereof for storing oil separated from BS & W in said treating chamber and filtered through said filter; and
   means for measuring the amount of oil processed through said filter and collected in said vessel, said lower section having sufficient capacity and height such that the oil stream velocity passing through said treating chamber does not exceed the rate BS & W separates and settles from the oil.

2. Apparatus as recited in claim 1 including insulation means surrounding said chamber and means for heating said chamber.

3. Apparatus as recited in claim 2 wherein said filter comprises fine weave cloth made of tetrafluoroethylene polymer plastic fiber.

References Cited by the Examiner

UNITED STATES PATENTS

| | | | |
|---|---|---|---|
| Re. 12,272 | 10/04 | Conn | 210—313 X |
| 2,294,263 | 8/42 | Wilson | 210—299 |
| 2,546,269 | 3/51 | Lovelady | 210—299 |
| 2,970,468 | 2/61 | Price | 73—61 |

OTHER REFERENCES

Page 39; August 10, 1959; "Filter Cloth," C & EN.

RICHARD C. QUEISSER, *Primary Examiner.*

ROBERT EVANS, *Examiner.*